United States Patent [19]

Böhnke et al.

[11] Patent Number: 4,859,649
[45] Date of Patent: Aug. 22, 1989

[54] SEMI-FINISHED PRODUCTS OF FERRITIC STEEL AND CATALYTIC SUBSTRATE CONTAINING SAME

[75] Inventors: Kurt Böhnke, Wetter; Helmut Brandis, Krefeld; Hans-Heinrich Domalski, Wetter; Hans-Joachim Fleischer, Velbert; Heinrich Frinken, Wetter, all of Fed. Rep. of Germany

[73] Assignee: Thyssen Edelstahlwerke AG, Krefeld, Fed. Rep. of Germany

[21] Appl. No.: 162,796

[22] Filed: Feb. 26, 1988

[30] Foreign Application Priority Data

Feb. 27, 1987 [DE] Fed. Rep. of Germany ....... 3706415

[51] Int. Cl.$^4$ .................... B01J 32/00; C22C 38/02; C22C 38/06; C22C 38/18
[52] U.S. Cl. .................................. 502/439; 148/325
[58] Field of Search ..................... 502/439; 148/325

[56] References Cited

U.S. PATENT DOCUMENTS

| 3,992,161 | 11/1976 | Cairns et al. | 75/244 X |
| 4,055,448 | 10/1977 | Fujikura et al. | 148/325 |
| 4,414,023 | 11/1983 | Aggen et al. | 502/439 X |
| 4,601,999 | 7/1986 | Retallick et al. | 502/439 X |
| 4,726,853 | 2/1988 | Gressin et al. | 148/328 X |

FOREIGN PATENT DOCUMENTS

| 727072 | 2/1966 | Canada | 148/325 |
| 946268 | 4/1974 | Canada | 148/325 |

Primary Examiner—W. J. Shine
Attorney, Agent, or Firm—Cushman, Darby & Cushman

[57] ABSTRACT

A ferritic, heat-resistant steel whose behavior at high application temperatures is improved by the combined addition of oxygen affinitive elements. Apart from stabilizing the electric resistance of heating elements by addition of zirconium, titanium and rare earth metal, also the creep elongation of the steel is considerably reduced under load at temperatures above 900° C., the thermal stress capacity thus being increased. The resulting complex oxide coating increases the protective function with regard to preserving the metallic cross-section in continuous and/or cyclic heat treatments.

The steel is composed of:
up to 0.10 % C
up to 0.80 % Si
0.10 to 0.50 % Mn
up to 0.035 % P
up to 0.020 % S
12 to 30 % Cr
0.10 to 1.0 % Mo
up to 1 % Ni
3.5 to 8 % Al
0.01 to 1 % Zr
0.003 to 0.8 % rare earth metals
0.003 to 0.30 % Ti
0.003 to 0.050 % N remainder Fe and incidental impurities.

10 Claims, 3 Drawing Sheets

200:1
1200 °C

200:1
1200 °C

SEMI-FINISHED PRODUCTS OF FERRITIC STEEL AND CATALYTIC SUBSTRATE CONTAINING SAME

The present invention relates to semi-finished products, especially sectional and flat products of ferritic steel and to their use.

BACKGROUND OF THE INVENTION

For many applications in which alloys are employed, resistance to deformation is necessary, in addition to resistance to oxidation, for service under conditions of cyclic and continuous thermal stress at temperatures far above 900° C. Electric resistance heating elements are examples of such applications.

Iron-chromium-aluminum alloys are equal or superior to austenitic resistance alloys, owing to their high specific electric resistance (values of up to 1.6 Ohm.mm $2^2 m^{-1}$ are known) and to their resistance to scaling. However, the austenitic nickel-chromium alloys exhibit clear advantages as to creep behavior when heated by electric current at temperatures above 1000° C. Therefore, the improvement of creep properties, i.e. of creep elongation under thermal stress, of iron-chromium-aluminum alloy steels are of technical and economic advantage. These more favorably-priced steels could usefully be employed in an extended temperature range.

Yttrium additions between 0.01 and 3% are known to improve the creep properties of iron-chromium-aluminum steels (all percentages are mass percentages).

German Offenlegungsschrift No. 29 16 959 describes the improvement of hot gas corrosion behavior by yttrium and silicon additions. The carrier of these properties is preferably the $\alpha$-$Al_2O_3$ produced at temperatures of more than 1000° C. at the surfaces of heating elements with resistance heating and support foils in exhaust gas purification devices (catalysts) of motor vehicles. Apart from the financial aspect raised by the high production costs of the yttrium prealloy, this element—when used in iron-chromium-aluminum alloys—presents the disadvantage of reducing the maximum application temperature to about 1250° C. This is due to the eutectic compositions being formed in the binary system yttrium/iron, e.g. between $YFe_4$ and $YFe_5$. The relevant details were described by R. F. Domagala, J. J. Rausch and D. W. Levinson in Trans. ASM 53 (1961), p. 137–155, and by R. P. Elliott in "Constitution of Binary Alloys (1st supplement)" McGraw-Hill Book Company, New York, (1965), page 442, FIG. 231 Fe-Y.

The fundamentals for resistance to scaling were described by H. Pfeiffer and H. Thomas in "Zunderfeste Legierungen", Springer Verlag 1963, 2d edition, Berlin/Gottingen/Heidelberg, pages 248 and 249. The alumina ($Al_2O_3$) mainly performs a protective function against oxidation. Conditions above 1000° C. are most important for the working life. On evaluating the working life, i.e. the duration of the cyclic or continuous thermal stress, special importance has to be attached to the adhesiveness between the metallic sectional area and its $Al_2O_3$ coating. The alumina layer offers optimum protection, if its density is high and if the oxide does not spall. Due to the different thermal expansion coefficients of the metallic matrix and of the oxide, however, spalling of the oxide layer is likely to occur to a greater or lesser extent. J. Peters and H. J. Grabbke ("Werkstoffe und Korrosion" 35 (1984) p. 385 to 394) have examined the influence of oxygen-affinitive elements on ferrous alloys, with the result that titanium containing steels alloyed with chromium and aluminum form a good protective coating. This favorable behavior is the consequence of the formation of a fine-grained alumina coating on a titanium oxicarbide layer between $Al_2O_3$ and ferrite.

Furthermore, U.S. Pat. No. 4,414,023 describes a heat-resistant ferritic and non-corrosive steel alloy which is a steel which contains 8 to 25% chromium, 3 to 8% aluminum and an addition of rare earth metals, viz. cerium, lanthanum, neodymium, praseodymium, and other elements of this group within the range of composition between 0.002% and max. 0.06% and which forms an adhesive composition between the oxide and the ferritic matrix. It was especially emphasized that (a) titanium additions have no negative influence, (b) zirconium has no or merely a slightly positive influence on the adhesiveness in case of concentrations of up to 0.008%, (c) only one element should be used, since in the case of complex alloys, the element with the most negative influence determines the protective function against oxidation.

U.S. Pat. No. 3,992,161 discloses a steel which contains 10 to 40% Cr, 1–10% Al, up to 10% Ni, up to 20% Co, up to 5% Ti, up to 2% of each of rare metals Y, Zr, Nb, Hf, Ta, Si, V, up to 6% of W and Mo respectively, up to 0.4% C, up to 0.4% Mn and 0.1 to 10% by volume of a dispersoid of the group metal oxide, metal carbide, metal nitride, metal boride, remainder iron. This steel is especially designed for the production of resistance heating elements, blades and combustion chambers of gas turbines. The essential component for achieving the desired strength properties of this steel is the dispersoid, the total contents of which amounts to—according to the embodiments—about 1% of the weight of the steel. Dispersoids increase the strength, albeit at the expense of ductility. However, they deteriorate the workability considerably. Therefore, an increased volume of finishing work is required, since surface defects will occur to a greater extent during the processing due to the lower purity degree of the steel. These surface defects have to be eliminated by grinding, so that high costs are incurred consequently. A special disadvantage of U.S. Pat. No. 3,992,161 is the costly powder-metallurgical process which is only worth considering in order to obtain the necessary fine distribution of the dispersoids within the range of 50 to 5000 Å. A sufficiently fine distribution of the dispersoids cannot be achieved in metallurgical melting processes. Moreover, the known steel has poor welding properties due to the contents of dispersoids and a low creep resistance under thermal stress.

SUMMARY OF THE INVENTION

The object of the present invention is to improve the resistance to oxidation of ferritic heat-resistant steels having an a iron-chromium aluminum basis in such a way that the original properties of products are preserved when used for heating elements which are heated by electric resistance and for metallic support foils in catalysts, e.g. for exhaust gas purification, even after a long working life. A further object is to improve the workability in order to avoid increased finishing work as described above.

These objects are achieved with steel containing the usual quantities of chromium and aluminum, but also special additions of silicon, manganese, molybdenum, zirconium, titanium, nitrogen, calcium, and magnesium. A preferred addition of rare earth metals in quantities of 0.003 to 0.80%g improves the behavior of the electric resistance under the influence of high temperatures maintained over an extended period of time and increases the high-temperature stability at elevated temperatures. The stability is further enhanced owing to the preferred addition of niobium (columbium) in a quantity of up to 0.5%.

BRIEF DESCRIPTION OF FIGURES OF DRAWING

DETAILED DESCRIPTION OF PREFERRED EMBODIMENTS

Figure 1:
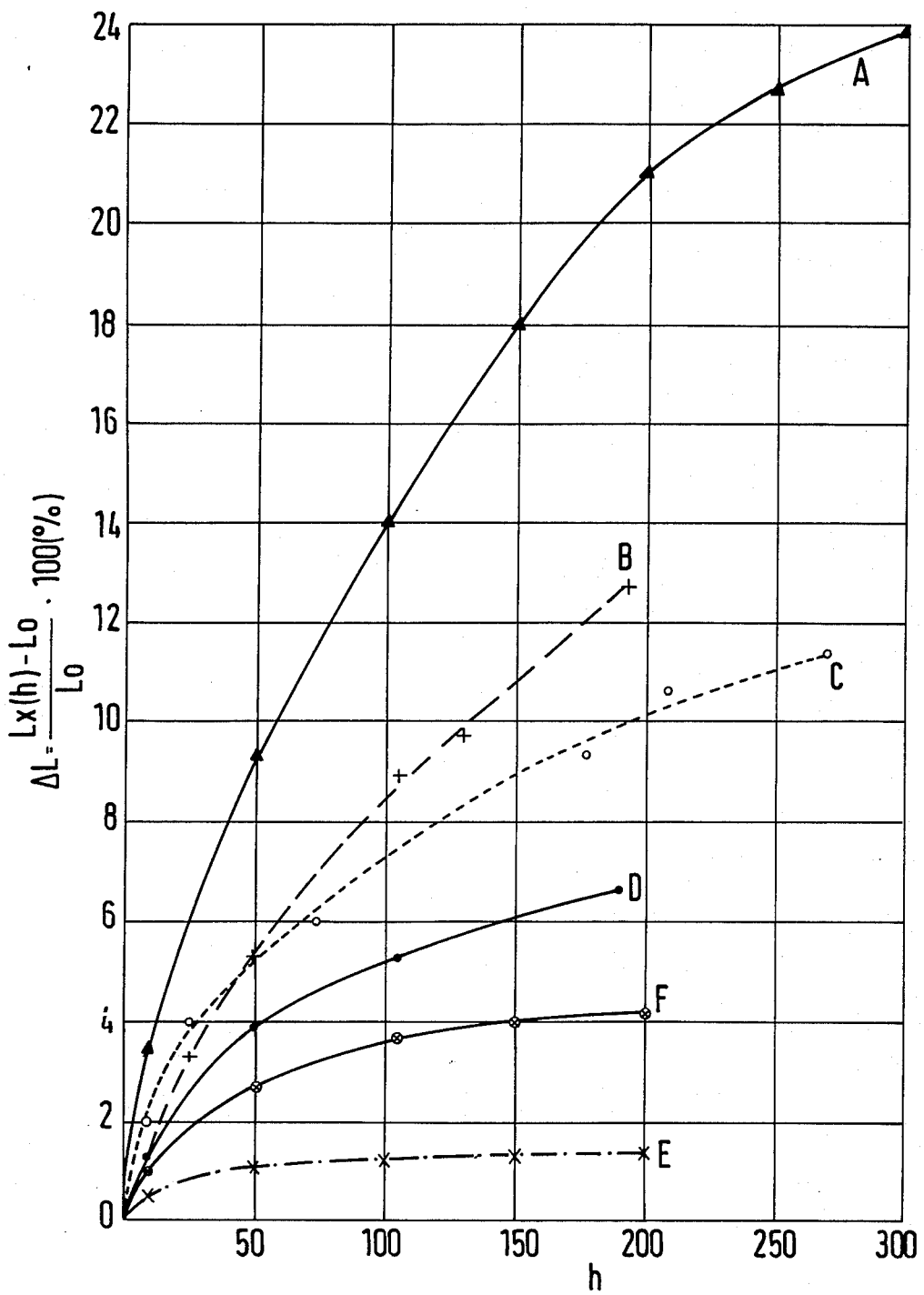
FIG. 1 is a graph which shows the effect of alloy composition on elongation due to creep.

More specifically, the present invention is concerned with a semi-finished product in the form of a wire rod, a bar, a billet, a sheet or strip of a ferritic steel alloy consisting essentially of 0.008 to 0.10% carbon, up to 0.80% silicon, 0.10 to 1.00% manganese, up to 0.035% phosphorus, up to 0.020% sulphur, 12 to 30% chromium, 0.1 to 1.0% molybdenum, up to 1% nickel, 3.5 to 8.0% aluminum and additions of 0.010 to 1.0% zirconium, 0.003 to 0.3% titanium and 0.003 to 0.30% nitrogen, remainder iron including incidental impurities.

A preferred form of the invention is concerned with a semi-finished product as described above wherein the ferritic steel alloy additionally contains 0.003 to 0.80% rare earth metals.

A still further preferred form of the invention is concerned with a semi-finished product as described above comprising a ferritic steel essentially of
up to 0.04% C,
0.20 to 0.70% Si,
0.10 to 0.40% Mn,
up to 0.025% P,
up to 0.01% S,
15 to 26% Cr,
0.1 to 0.35% Mo,
up to 0.20% Ni.
4.8 to 7.0% Al.
0.05 to 0.50% Zr,
0.10 to 0.30% Ti and
0.008 to 0.030% N,
remainder iron and incidental impurities.

Preferably, in the last mentioned semi-finished product the steel contains additionally 0.003 to 0.80% rare earth metals.

In a still further preferred form of the invention, the steel consists essentially of
up to 0.04% C
0.20 to 0.7% Si
0.10 to 0.4% Mn
up to 0.025% P
up to 0.01% S
15 to 26% Cr
0.1 to 0.35% Mo
up to 0.2% Ni
4.8 to 7.0% Al
0.05 to 0.5% Zr
0.010 to 0.3% Ti
0.005 to 0.03% N
0.005 to 0.05% rare earth metals.
remainder iron including incidental impurities.

Preferably the first mentioned steel contains additionally up to 0.5% niobium (columbium).

In a yet further preferred form, the steel of the invention consists essentially of
up to 0.04% C
0.20 to 0.7% Si
0.10 to 0.4% Mn
up to 0.025% P
up to 0.005% S
15 to 26% Cr
0.1 to 0.35% Mo
up to 0.20% Ni
4.8 to 7.0% Al
0.050 to 0.5% Zr
0.010 to 0.3% Ti
0.005 to 0.03% N
up to 0.5% Nb
0.005 to 0.05% rare earth metals
remainder iron and incidental impurities.

It also is preferred that the steel contains additionally 0.005 to 0.05% calcium plus magnesium.

Apart from the well-known advantages of the commercial alloying elements, such as chromium and aluminum, the effect obtained by the special additions described above, in combination with each other, is essential for the stability of the protective coatings being produced through oxidation and for their function in the intended purposes. Besides the improvement of the material properties, e.g. the postponement of the beginning of coarse grain formation to higher temperatures, a high affinity to oxygen is characteristic for all the elements mentioned above, owing to which the scaling of chromium and aluminum is delayed. Moreover, the adhesiveness of the generated oxide coatings is improved. An impoverishment of chromium at the grain boundaries is avoided by the presence of zirconium and titanium. The resistance to scaling caused by aluminum and chromium is preserved over the whole metal surface. A rapid heating or cooling and the problems resulting therefrom due to the greatly differing expansion coefficients of the metallic alloy and the scale coating is typical for the indicated applications. The combined special additives improve the adhesiveness considerably as compared with the above quoted assumptions of G. Aggen and P. R. Bornemann. The negative effects of titanium alloying additives mentioned above unexpectedly do not occur when a combination of titanium and zirconium is added. Hot corrosion, electrical resistance behavior, and high-temperature stability at temperatures over 1000° C. and up to about 1350° C. are considerably improved.

The mechanical stress capacity of ferritic materials at temperatures of more than 1100° C. can be increased by using alloying elements which are less costly than the austenitic chromium and nickel alloyed steels. The metallic structural parts for the production of all kinds of heating elements as well as of exhaust gas pipes and metallic supports installed therein are superior to the known alloying combinations in meeting the requirements of these applications mentioned above. Apart from the above-stated properties, the ductility is favorably influenced during the production of stock (sectional and flat products) upon shaping and heat treatment. The same applies to the reduction of brittleness at temperature strains upon and after welding for the production and mounting of, e.g., exhaust gas systems and metallic support bodies of Fe-Cr-Al foils in catalysts and upon operating these structural parts within the intended stress ranges. Therefore, the new steels are preferably designed to be used as materials for the production of heating elements in electrothermic engineering and thermally highly stressed structural parts such as combustion chambers, exhaust gas systems (after combustion processes) and elements for the reduction of harmful substances in combustion gases (catalyst support foils).

The steel according to the invention is characterized by additions of several elements having an affinity for oxygen in combination with each other and in case of need—rare earth metals. The result is a heat-resistant steel alloy appropriate for elevated application temperatures owing to an improved high-temperature stability of the ferritic microstructure. All the applications mentioned have in common that the new steels form adhesive $Al_2O_3$ scale coatings at elevated temperatures, also in case of cyclic stress.

The special additions influence the workability of semi-finished products (sectional and flat steel) and the behavior under practical service conditions of the structural parts made of heat-resistant alloys in such a way that the ductility of the ferritic matrix is increased and the resistance to deforming is preserved even within the temperature range over 1000° C.

Within the scope of the applications mentioned above, at high temperatures, the influence of the individual concentrations of the alloying elements according to the invention can be described as follows:

With regard to the formation of an oxide coating, especially to its evenness, an upper limit must be fixed for the carbon content. The influence of the chromium concentration has to be varied between 12 and 30% according to the thermal stress produced in the different applications. Chromium, as a substantial element of the transformation-free ferritic structure, is likely to range between 19 and 26%, especially in case of frequently changing temperatures in the upper range of concentration.

Aluminum is, besides chromium, essential to increase and maintain the oxidation resistance. The application purposes presented above require —especially in case of operating temperatures exceeding 1000° C.—aluminum concentrations between 5 and 8%. Aluminum is the support for the formation of the oxide coating, which consists almost exclusively of $Al_2O_3$. High aluminum contents are the condition for a longer service life, especially in case of cyclic temperature stress.

The zirconium content has the function of bonding carbon. Furthermore, an addition of zirconium ensures that the chromium content will remain evenly distributed in metallic form within the microstructure even during thermal stress. An impoverishment of chromium along the grain boundaries does not take place. Thus the occurrence of intercrystalline corrosion is avoided.

Titanium has the same effect, with its influence on the improvement of the electric resistance behavior, on the resistance to scaling and on the mechanical properties at elevated temperatures (e.g. 900° to 1300° C.) being, however, inferior to that of zirconium as additional alloying element. For improving the properties of Fe-Cr-Al alloys the combined addition of titanium and zirconium is preferred.

Adding calcium and magnesium serves to improve the degree of purity, the susceptibility to cracking during hot forming thus being reduced.

Sectional steel and sheet/foil are produced in various dimensions. It has proved favorable to use alloys with elevated nitrogen contents for thick-walled structural parts in all product shapes. In combination with the mentioned additions, this leads to the formation of special nitrides which postpone the beginning of coarse grain formation to higher temperatures. Furthermore, the reaction products of nitrogen, together with the special additions, can increase the high temperature stability of the ferritic matrix.

The protective function of the oxide layer which is improved by the present alloy composition, leads to a direct influence on electric resistance.

Segregations of intermetallic phases in the metallic matrix, i.e. in the cross-section area of the conductor, also increase the resistance to hot drawing stress; the change in length due to creep during extended period under load is reduced.

The electric resistance was examined at temperatures above 1000° C., in the case of iron-chromium-aluminum alloy with special additions preferentially at 1200° C. The thermal stress was continuous or cyclic, the normal frequency being 15 cycles per hour. The electric resistance in the mentioned temperature range was measured by comparison with a calibrating resistance. The values of the changes in length caused by creep were ascertained by means of a pilot wire gauge.

The stages of development of the chemical composition of the ferritic iron-chromium-aluminum alloys are shown in connection with the melts (A to E) given in Table 1, namely on the basis of the known additions of the elements:

| Basic Composition | Alloying elements | |
| --- | --- | --- |
| Fe—Cr—Al alloys | + zirconium: | melts A and C |
| | + titanium: | melt B, |
| | + zirconium + titanium: | melts D and F |
| | + zirconium + titanium: + cerium/lanthanum: | melt E |

Melts A to C represent the state of the art; melts D to F are composed according to the invention.

Figure 2:
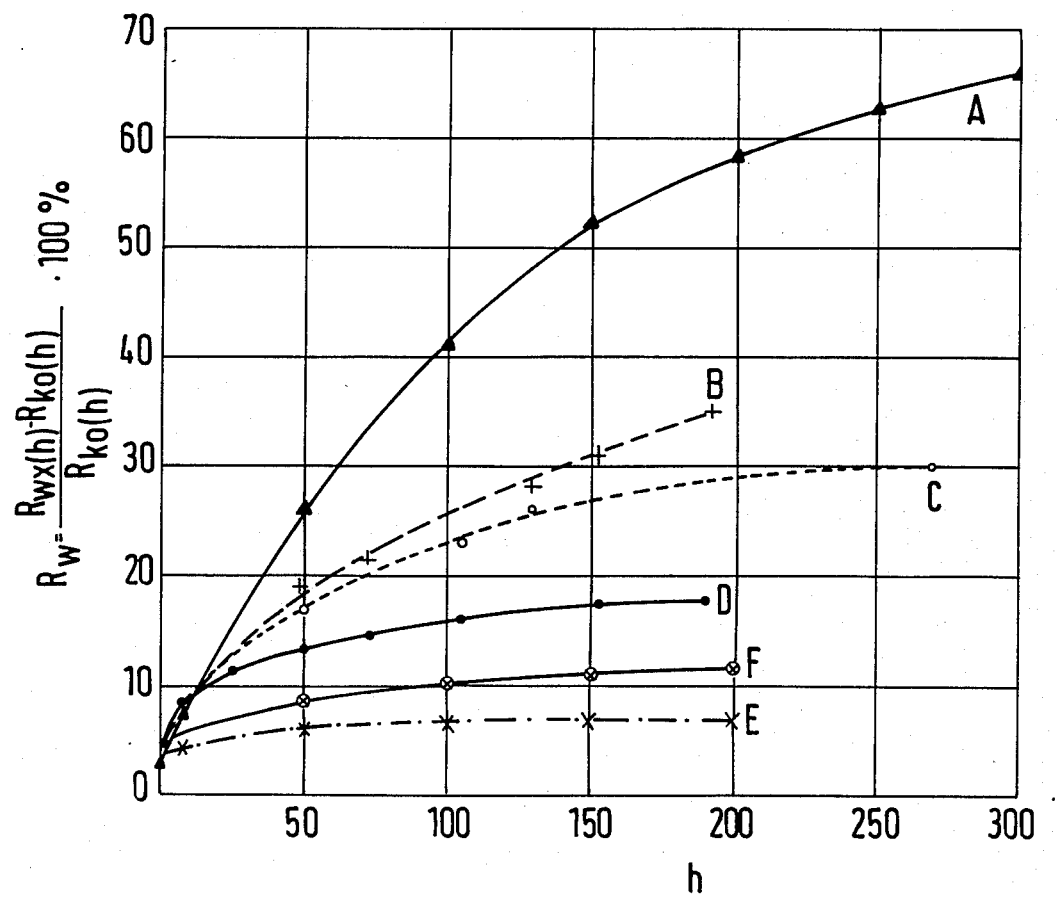
FIG. 2 is a graph which shows the effect of alloy composition on electrical resistance.

The possibilities of influencing the electric resistance behavior and the change in length, which are given by these variants of the chemical compositions, are shown in FIGS. 1 and 2, in which the elongation due to creep (in FIG. 1) and the increase in electric resistance, in this case at 1200° C. (in FIG. 2), are indicated as a function of the testing period.

When plotted in linear scale (FIG. 1) on the coordinates, the relation between change in length and testing period is represented in a parabolic graph. As to the melts containing exclusively zirconium or titanium additions, the carbon content of the melt proves to be the dominant factor for the change in length; see items A, C and B.

Melts D and F with zirconium and titanium additions exhibit considerably reduced creep values. In addition, a content of rare earth metals contributes to reducing the creep elongation, i.e. to increasing the resistance to hot drawing stress; charge E.

FIG. 2 shows an analogous behavior; the change of electric heat resistance in relation to the testing period exhibits a parabolic graph. There is no direct connection, however, between the change in length and the increase in electric resistance illustrated in FIG. 2

It is assumed that the cross-section of the metallic conductor and its chemical composition during the individual stages of the testing period determines the value of the electric resistance.

The behavior of the electric resistance ($R_h$-) is improved by adding a zirconium-titanium (and cerium/-lanthanum) combination.

The disadvantages exhibited by ferritic steel are —in case of use as heating element in electrothermic engineering —markedly reduced as compared with austenitic nickeliferous alloys by raising the high-temperature stability at a high specific electric resistance. Even with high chromium concentration there is no danger of any deterioration due to embrittlement as a result of intermetallic combinations (e.g. sigma phase) or of a 475° C. embrittlement. As an additional improvement, the new steel exhibits a good stability of shape owing to a low thermal expansion coefficient in the fields of application electrothermic engineering and exhaust gas systems.

The abstract of the properties described above shows that the ductility of this steel is improved on a low-cost alloying basis (chromium, aluminum, iron) through the combination—even in small quantities—of alloying elements, whereby the disadvantages during the production of prefabricated parts can partly be eliminated. The most favorable properties under practical service conditions are basically the good oxidation resistance owing to adhesive scale coatings and the elevated high-temperature stability of the prefabricated parts under service stress. Besides the possible weldability —taking into account the measures normally taken with highly chromiferous steels —a special adaptation of the alloying elements and their concentrations to the different operating conditions can be effected within the indicated analytical range.

Figure 3:
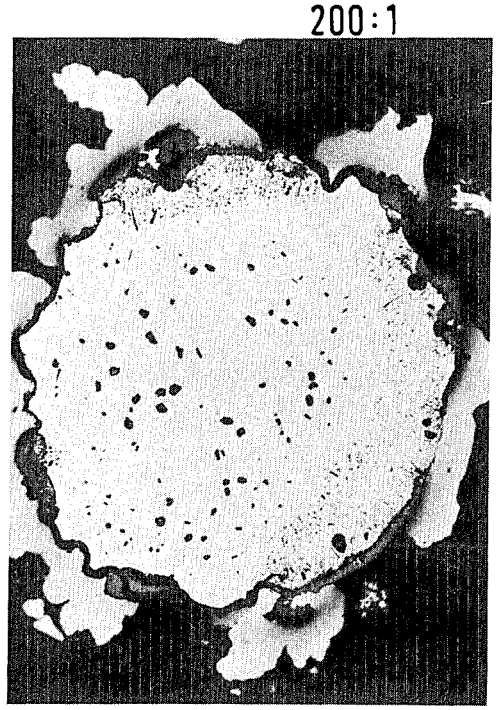
FIG. 3 is a photograph showing a cross-section of a specimen taken from a melt according to the state of the art.

The cross-section of a specimen taken from melt A is shown in FIG. 3. The aluminiferous surface layer obviously does not fulfill its protective function in this case, as spalls have occurred over almost the whole circumference after exposure to 1200° C., so that the core now lies bare, and immediate reactions with the oxygen and nitrogen contents from the uncombined atmosphere can take place. These reactions cause a reduction of the electrically conductive cross-section, thus entailing an unwelcome increase in the electric resistance.

Figure 4:
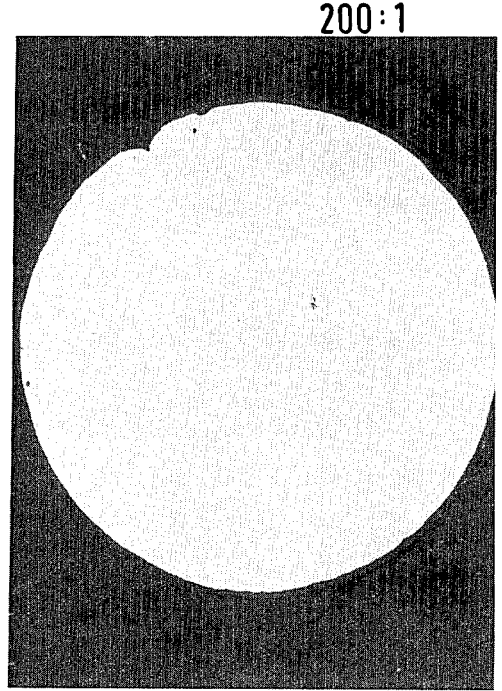
FIG. 4 is a photograph showing a cross-section of a specimen taken from a melt according to the invention.

FIG. 4 shows the cross-section of a specimen taken from melt E, which is composed according to the invention and which was exposed to the same conditions as the specimen in FIG. 3. The scale layer consisting mainly of aluminum oxide has retained its even thickness, is still adhesive and intact, thus fulfilling the protective function which it is supposed to perform. Contrary to the specimen of FIG. 3, which exhibits ALN inclusions, the specimen shown in FIG. 4 is free from nitrogenous compounds.

TABLE 1

| Melt | C | Si | Mn | P | S | Cr | Mo | Ni | V | W | Co | Cu | Al | N | Ti | Nb | Ce | Zr | Ca | Mg |
|---|---|---|---|---|---|---|---|---|---|---|---|---|---|---|---|---|---|---|---|---|
| A | 0.043 | 0.52 | 0.23 | 0.013 | <0.003 | 21.57 | 0.03 | 0.64 | 0.09 | 0.03 | 0.03 | 0.04 | 5.43 | 0.013 | 0.010 | <0.010 | <0.003 | 0.190 | 0.003 | <0.002 |
| B | 0.019 | 0.63 | 0.36 | 0.014 | <0.003 | 21.79 | 0.03 | 0.19 | 0.03 | 0.03 | 0.03 | 0.02 | 5.24 | 0.006 | 0.287 | <0.01 | <0.003 | 0.001 | 0.001 | <0.002 |
| C | 0.016 | 0.39 | 0.25 | 0.013 | <0.003 | 21.89 | 0.03 | 0.14 | 0.05 | 0.03 | 0.04 | 0.03 | 5.45 | 0.010 | 0.011 | <0.01 | <0.003 | 0.180 | 0.003 | 0.003 |
| D | 0.016 | 0.32 | 0.27 | 0.014 | <0.003 | 21.17 | 0.05 | 0.14 | 0.05 | 0.02 | 0.03 | 0.03 | 5.59 | 0.014 | 0.295 | <0.01 | <0.003 | 0.201 | 0.005 | <0.002 |
| E | 0.010 | 0.26 | 0.28 | 0.013 | <0.003 | 21.48 | 0.02 | 0.24 | 0.04 | 0.03 | 0.02 | 0.01 | 5.43 | 0.018 | 0.130 | <0.01 | 0.017 | 0.180 | 0.003 | <0.005 |
| F | 0.012 | 0.44 | 0.26 | 0.011 | <0.003 | 21.64 | 0.05 | 0.12 | 0.07 | 0.04 | 0.03 | 0.04 | 5.50 | 0.009 | 0.123 | <0.01 | <0.003 | 0.207 | 0.002 | 0.005 |

What is claimed is:

1. A semi-finished product in form of a wire rod, a bar, a billet, a sheet or strip of a ferritic steel alloy consisting essentially of 0.008 to 0.10% carbon, up to 0.80% silicon, 0.10 to 1.00% manganese, up to 0.035% phosphorus, up to 0.020% sulphur, 12 to 30% chromium, 0.1 to 1.0% molybdenum, up to 1% nickel, 3.5 to 8.0% aluminum and additions of 0.010 to 1.0% zirconium, 0.003 to 0.3% titanium and 0.003 to 0.30% nitrogen, remainder iron including incidental impurities.

2. A semi-finished product according to claim 1 wherein the ferritic steel alloy additionally contains 0.003 to 0.80% rare earth metals.

3. A semi-finished product according to claim 1 comprising a ferritic steel consisting essentially of
   up to 0.04% C.,
   0.20 to 0.70% Si,
   0.10 to 0.40% Mn,
   up to 0.025% P,
   up to 0.01.% S,
   15 to 26% Cr,
   0.1 to 0.35% Mo,
   up to 0.20 % Ni.
   4.8 to 7.0 % Al.
   0.05 to 0.50% Zr,
   0.10 to 0.30% Ti and
   0.008 to 0.030% N,
   remainder iron and incidental impurities.

4. A semi-finished product according to claim 3 wherein the steel contains additionally 0.003 to 0.80% rare earth metals.

5. A semi-finished product according to claim 1 comprising a steel consisting essentially of
   up to 0.04% C.
   0.20 to 0.7% Si
   0.10 to 0.4% Mn
   up to 0.025% P
   up to 0.01% S
   15 to 26% Cr
   0.1 to 0.35% Mo
   up to 0.2% Ni
   4.8 to 7.0% Al
   0.05 to 0.5% Zr
   0.010 to 0.3% Ti
   0.005 to 0.03% N
   0.005 to 0.05% rare earth metals.

remainder iron including incidental impurities.

6. A semi-finished product according to claim 1 wherein the steel contains additionally up to 0.5% niobium (columbium).

7. A semi-finished product according to claim 1 comprising a steel consisting essentially of
up to 0.04% C
0.20 to 0.7% Si
0.10 to 0.4% Mn
up to 0.025% P
up to 0.005% S
15 to 26% Cr
0.1 to 0.35% Mo
up to 0.20% Ni
4.8 to 7.0% Al
0.050 to 0.5 % Zr
0.010 to 0.3% Ti
0.005 to 0.03% N
up to 0.5 % Nb
0.005 to 0.05% rare earth metals
remainder iron and incidental impurities.

8. A semi-finished product according to any of claims 1 to 7, wherein the steel contains additionally 0.005 to 0.05% calcium plus magnesium.

9. A catalyst comprising a catalytic substrate made from material according to any of claims 1 to 7.

10. A catalyst comprising a catalytic substrate made from material according to claim 8.

* * * * *